US009258700B2

(12) United States Patent
Lindholm et al.

(10) Patent No.: US 9,258,700 B2
(45) Date of Patent: Feb. 9, 2016

(54) SYSTEMS AND METHODS FOR UTILIZING IMS DATA SECURITY MECHANISMS IN A CIRCUIT SWITCHED NETWORK

(71) Applicant: Telefonaktiebolaget L M Ericsson (publ), Stockholm (SE)

(72) Inventors: Fredrik Lindholm, Stockholm (SE); Rolf Blom, Jarfalla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/558,340

(22) Filed: Dec. 2, 2014

(65) Prior Publication Data
US 2015/0089212 A1    Mar. 26, 2015

Related U.S. Application Data

(62) Division of application No. 13/127,832, filed as application No. PCT/IB2008/002973 on Nov. 5, 2008, now Pat. No. 8,996,858.

(51) Int. Cl.
*G06F 21/00* (2013.01)
*H04L 29/06* (2006.01)
*H04W 12/02* (2009.01)
*H04W 12/04* (2009.01)

(52) U.S. Cl.
CPC ........... *H04W 12/02* (2013.01); *H04L 63/0435* (2013.01); *H04L 63/0876* (2013.01); *H04L 63/18* (2013.01); *H04W 12/04* (2013.01); *H04L 63/062* (2013.01); *H04L 65/1016* (2013.01)

(58) Field of Classification Search
CPC ...... H04W 12/02; H04W 12/04; H04L 63/18; H04L 63/062; H04L 65/1016
See application file for complete search history.

(56) References Cited

U.S. PATENT DOCUMENTS

| | | | | |
|---|---|---|---|---|
| 2002/0068591 | A1* | 6/2002 | Uskela | H04W 4/14 455/466 |
| 2008/0025293 | A1 | 1/2008 | Kannan et al. | |
| 2008/0056464 | A1 | 3/2008 | Kalahasti et al. | 379/88.18 |
| 2009/0063858 | A1 | 3/2009 | Davis et al. | 713/168 |
| 2009/0116458 | A1 | 5/2009 | Ramesh et al. | 370/336 |

FOREIGN PATENT DOCUMENTS

| | | | |
|---|---|---|---|
| DE | 102005035723 B3 | 2/2007 | |
| EP | 2088738 A1 | 8/2009 | |
| SE | 2088738 A1 * | 8/2009 | .......... H04L 63/0428 |
| WO | 2005069940 A2 | 8/2005 | |

(Continued)

OTHER PUBLICATIONS

3GPP, "3rd Generation Partnership Project; Technical Specification Group Services and System Aspects; IMS media plane security (Release 8)," 3GPP TR 33.828 V0.8.1, Jun. 2008, 35 pages.

(Continued)

*Primary Examiner* — Izunna Okeke
(74) *Attorney, Agent, or Firm* — Rothwell, Figg, Ernst & Manbeck, P.C.

(57) ABSTRACT

Aspects of the present invention provide a mechanism to utilize IMS media security mechanisms in a CS network and, thereby, provide end-to-end media security in the case where the media traffic travels across both a CS network and a PS network.

10 Claims, 15 Drawing Sheets

(56) References Cited

FOREIGN PATENT DOCUMENTS

| WO | 2007085692 A1 | 8/2007 |
|---|---|---|
| WO | 2008023162 A2 | 2/2008 |

OTHER PUBLICATIONS

Baugher, et al., "The Secure Real-time Transport Protocol (SRTP)," Network Working Group, RFC 3711, Standards Track, Ericsson Research, Mar. 2004, 53 pages.

Arkko, et al., "MIKEY: Multimedia Internet KEYing," Network Working Group, RFC 3830, Standards Track, Ericsson Research, Aug. 2004, 62 pages.

Blom, et al., "SRTP Store and Forward draft-mattsson-srtp-store-and-forward-00," Network Working Group, Internet-Draft, Standards Track, Ericsson Research, Jul. 7, 2008, 16 pages.

3GPP, "3rd Generation Partnership Project; Technical Specification Group Services and System Aspects; IP Multimedia Subsystem (IMS) Centralized Services; Stage 2 (Release 8)," 3GPP TS 23.292 V8.1.0, Sep. 2008, 90 pages.

3GPP, "3rd Generation Partnership Project; Technical Specification Group Services and System Aspects; Voice Call Continuity (VCC) between Circuit Switched (CS) and IP Multimedia Subsystems (IMS); Stage 2 (Release 7)," 3GPP TS 23.206 V7.5.0, Dec. 2007, 36 pages.

3GPP, "3rd Generation Partnership Project; Technical Specification Group Services and System Aspects; Single Radio Voice Continuity (SRVCC); Stage 2 (Release 8)," 3GPP TS 23.216 V8.1.0, Sep. 2008, 29 pages.

3GPP, "3rd Generation Partnership Project; Technical Specification Group Services and Architecture; IP Multimedia Subsystem (IMS) Service Continuity; Stage 2 (Release 8)," 3GPP TS 23.237 V8.1.0, Sep. 2008, 41 pages.

Office Action issued on Jan. 14, 2014 in Chinese application No. 200880131931.8 (English translation only), 7 pages.

Baugher et al., Secure real-time transport protocol, Mar. 2004, Network Working Group.

\* cited by examiner

SYSTEMS AND METHODS FOR UTILIZING IMS DATA SECURITY MECHANISMS IN A CIRCUIT SWITCHED NETWORK

CROSS-REFERENCE TO RELATED APPLICATIONS

The present application is a divisional of Ser. No. 13/127,832, filed on May 5, 2011 (published as US 20110213958), which is a 35 U.S.C. §371 National Phase Entry Application from PCT/IB2008/002973, filed Nov. 5, 2008, and designating the United States. The above identified applications and publications are incorporated by reference herein.

TECHNICAL FIELD

The present invention relates to IP multimedia subsystem (IMS) data security mechanisms.

BACKGROUND

Migration from circuit switched (CS) based networks to packet switched (PS) based networks (e.g., IMS based networks) will be done in steps, and the two networks may co-exist for a long time. A number of solutions have been standardized over the last years for enabling migration towards an IMS based infrastructure, such as, for example Voice Call Continuity (VCC). Most of these solutions allow a CS bearer to be used to carry speech traffic for a user, while providing the service control in IMS. The solutions may also allow the user to transfer traffic between CS bearers and PS bearers. With respect to media security, it is desired to provide a means for providing end-to-end media security in the case where the media traffic travels across both a CS network and a PS network.

SUMMARY

Aspects of the present invention provide a mechanism to utilize IMS media security mechanisms in a CS network and, thereby, provide end-to-end media security in the case where the media traffic travels across both a CS network and a PS network.

In one aspect, the invention provides a method performed by a gateway. In some embodiments, this method includes the following steps: establishing a circuit switched connection with a communication device; receiving from the communication device via the circuit switched connection a frame including a payload comprising an encrypted encoded data intended for a remote communication device and one or more encryption parameters (e.g., a counter value, an integrity tag, a key identifier) that is required by the remote communicate device to decrypt the encrypted encoded data; creating a protocol data unit that includes the encoded data and the encryption parameter; and transmitting via a packet switched network the protocol data unit so that it will be received by the remote communication device.

In some embodiments, the protocol data unit (PDU) (e.g., an SRTP PDU) includes a header portion and a payload portion, and the encoded data is placed in the payload portion and the encryption parameter is placed in the header portion. In some embodiments, the encoded data immediately follows or immediately precedes the encryption parameter in the frame. In some embodiments, the payload consist of the encrypted encoded data and the one or more encryption parameters.

In another aspect, the present invention provides an improved communication device (e.g., a mobile terminal). In some embodiments, the communication device includes: a key retrieving module configured to obtain or create an encryption key; a circuit switched connection establishment module for initiating a circuit switched connection; a payload creating module configured to produce a payload for a frame, wherein the payload includes encrypted encoded data and one or more encryption parameters; and a transmitter operable to transmit the frame to a gateway using the circuit switched connection. In some embodiments, the payload creating comprises an adaptive multi-rate (AMR) codec for producing the encoded data; and a security module configured to encrypt the encoded data and generate the frame payload. The key retrieving module may be operable to receive a message transmitted from the key management server, wherein the message includes the requested key. The key retrieving module may be further operable to transmit a message to a key management server, wherein the message includes a request for a key. In some embodiments, the key retrieving module is configured to transmit the message to the key management server using a short message service (SMS) or an Unstructured Supplementary Service Data (USSD) protocol.

In another aspect, the present invention provides a method performed by an application server. In some embodiments, the method includes the following steps: receiving at the application server a session initiation message transmitted from a mobile terminal, the session initiation message comprising a voucher (e.g., an encrypted key and/or other encryption information); storing the voucher included in the session initiation message; receiving at the application server a session initiation message transmitted from a gateway; determining whether the session initiation message transmitted from the gateway correlates with the session initiation message transmitted from the mobile terminal; retrieving the voucher in response to determining that the session initiation message transmitted from the gateway correlates with the session initiation message transmitted from the mobile terminal; and transmitting an session initiation message to another server after retrieving the voucher, wherein the session initiation message transmitted to the another server includes the voucher.

In some embodiments, the session initiation message transmitted from the mobile terminal is received via a packet switched network and includes information indicating that the mobile terminal shall use a circuit switched connection when communicating with the another terminal. In some embodiments, the step of determining whether the session initiation message transmitted from the gateway correlates with the session initiation message transmitted from the mobile terminal comprises determining whether information included in the session initiation message transmitted from the gateway matches information that was included in the session initiation message transmitted from the mobile terminal.

In another aspect, the present invention provides an application server for facilitating communications between a mobile terminal and another terminal. In some embodiments, the application server includes: a receiver operable to receive a session initiation message transmitted from the mobile terminal, the session initiation message comprising a voucher; a data storage unit for storing the voucher included in the session initiation message; a message correlating module configured to determine whether a session initiation message transmitted from a gateway correlates with the session initiation message transmitted from the mobile terminal; a voucher retrieving modules configured to retrieve the voucher in response to a determination that the session initiation message transmitted from the gateway correlates with the session initiation message transmitted from the mobile terminal; and a transmitter operable to transmit a session initiation message to another server after retrieving the voucher, wherein the session initiation message transmitted to the another server includes the voucher. In some embodiments, the receiver is operable to receive the session initiation message via a packet switched network, and the session initiation message includes information indicating that the mobile terminal shall use a circuit switched connection when communicating with the other terminal. Also, in some embodiments, the message correlating module is configured to determine whether the session initiation message transmitted from the gateway correlates with the session initiation message transmitted from the mobile terminal by determining whether information included in the session initiation message transmitted from the gateway matches information included in the session initiation message transmitted from the mobile terminal.

In other embodiments, the application server includes: a receiver operable to receive from a gateway an initiation message indicating that the mobile terminal has requested establishment of a secure session with the other terminal; a key management module configured to retrieve a voucher from a key management system in response to the receiver receiving the initiation message from the gateway; and a transmitter operable to transmit the retrieved voucher to another application server in response to the key management module retrieving the voucher.

In yet other embodiments, the application server includes: a receiver operable to receive a key request message transmitted from the mobile terminal; a key management module configured to transmit a key to the mobile terminal in response to receipt of the key request message; a data storage unit for storing the key; an initiation message transmitting module configured to (a) determine whether the stored key is associated with information that matches information included in an initiation message transmitted from a gateway and (b) in response to determining that that the stored key is associated with information that matches information included in the initiation message transmitted from the gateway, transmit to another server an initiation message. In some embodiments, the key management module is further configured, such that, in response to receipt of the key request message and prior to transmitting the key to the mobile terminal, the key management module obtains the key from a key management system.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
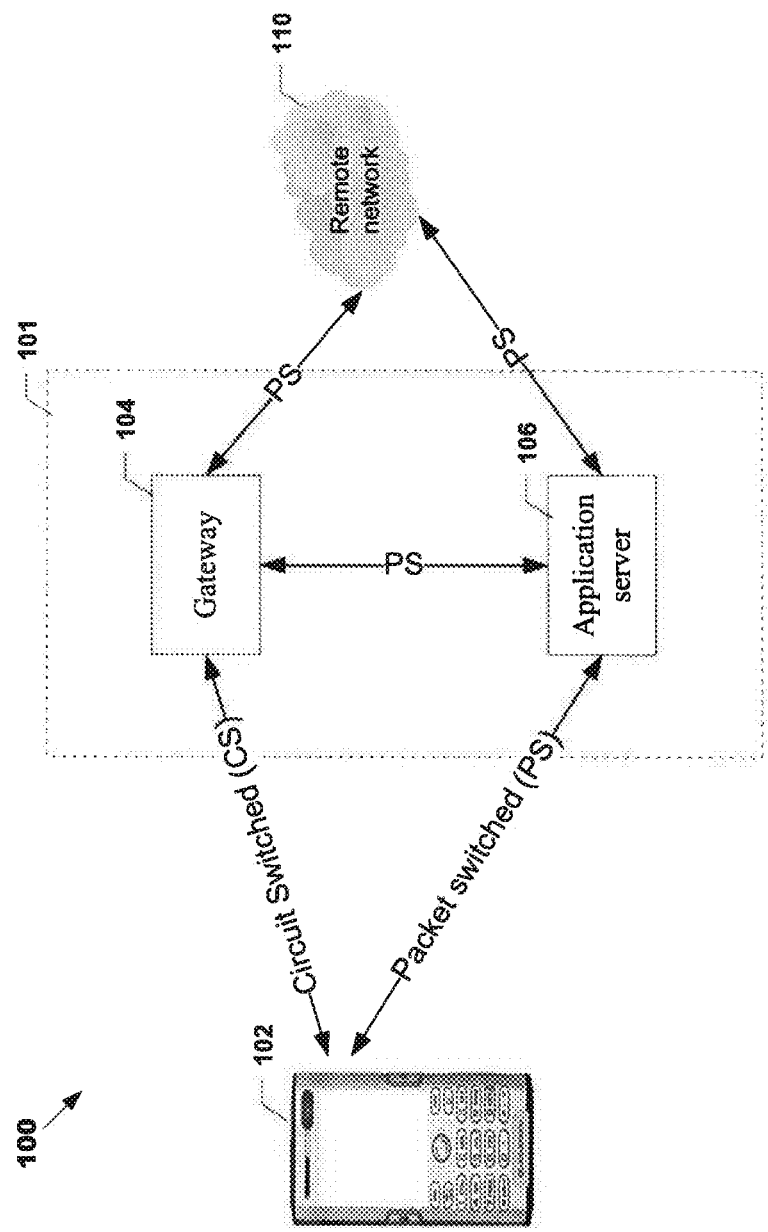
FIG. 1 illustrates a system according to an embodiment of the invention.

Referring now to FIG. 1, FIG. 1 illustrates a system 100 according to some embodiments of the invention. As shown, system 100 includes a communication device 102 (a.k.a., user equipment (UE) 102) that is operable to communicate with components of a network 101. As shown in FIG. 1, UE 102, which may be a mobile terminal, is operable to communicate with a "gateway" 104 using a circuit switched (CS) network and is operable to communicate with an "application server" 106 using a packet switched network (PS). As further shown, gateway 104 and application server 106 can communicate with each other using a PS network. Additionally, gateway 104 and application server 106 may be able to send messages to and receive messages from a remote network 110 using a PS network. Accordingly, gateway 104 functions to enable UE 102 to communicate with devices connected to remote network 110 by using both a CS connection and a PS connection.

Figure 2:
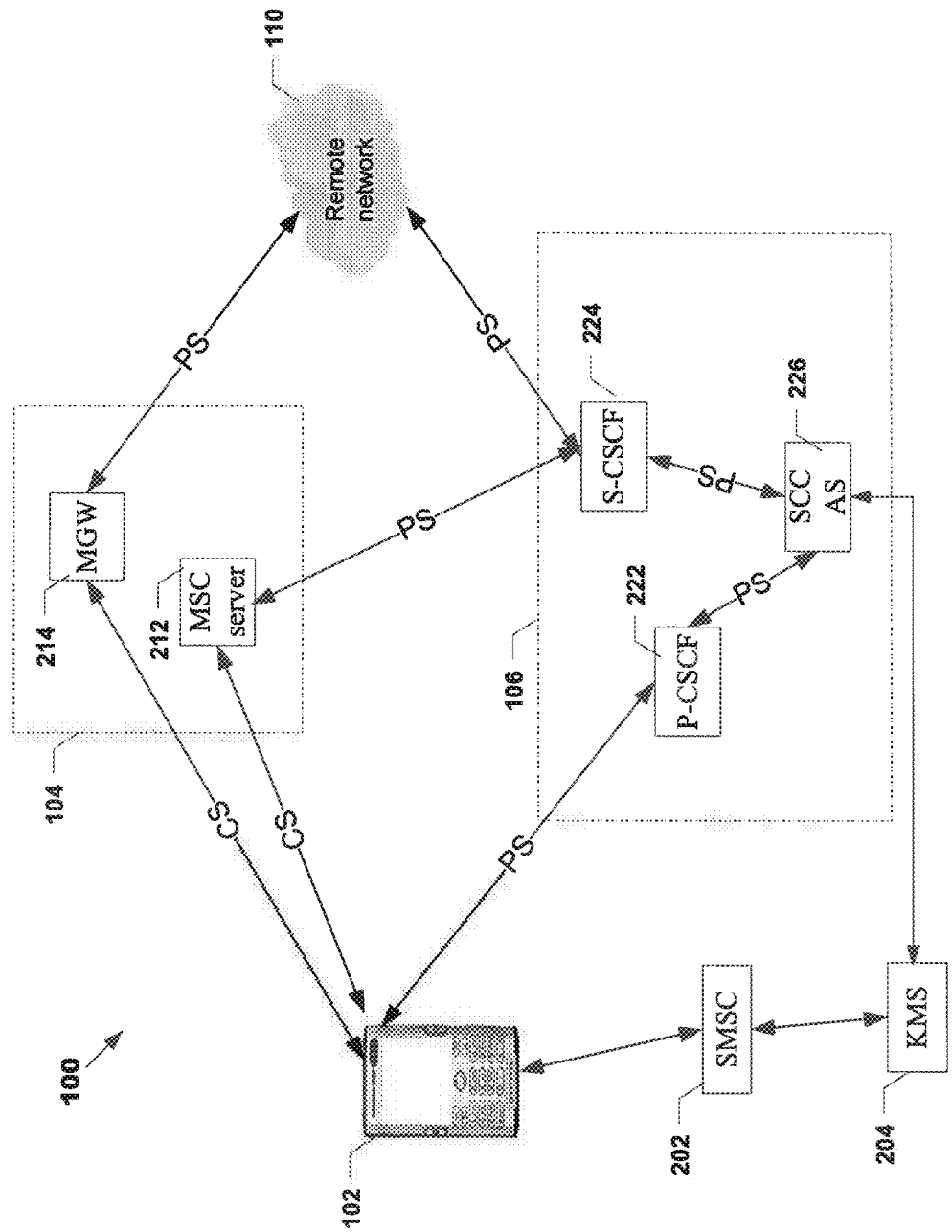
FIG. 2 further illustrate the system shown in FIG. 1.

Referring now to FIG. 2, FIG. 2 further illustrates system 100. As illustrated in FIG. 2, gateway 104 may includes one or more servers. For example, as shown, gateway 104 may include a switching center server 212 (e.g., a Mobile Switching Center) and a gateway server 214 (e.g., a media gateway (MGW)). As also illustrated, application server 106 may include one or more severs (e.g., one or more Session Initiation Protocol (SIP) servers). For example, as shown, application server 106 may include a proxy Call Session Control Function (P-CSCF) server 222, a serving CSCF (S-CSCF) 224, and a Service Centralization and Continuity Application Server (SCC AS) server. As further shown, system 100 may also include a Short Message Service Center (SMSC) 202 and a key management system 204, both of which may be components of network 101.

Figure 3:
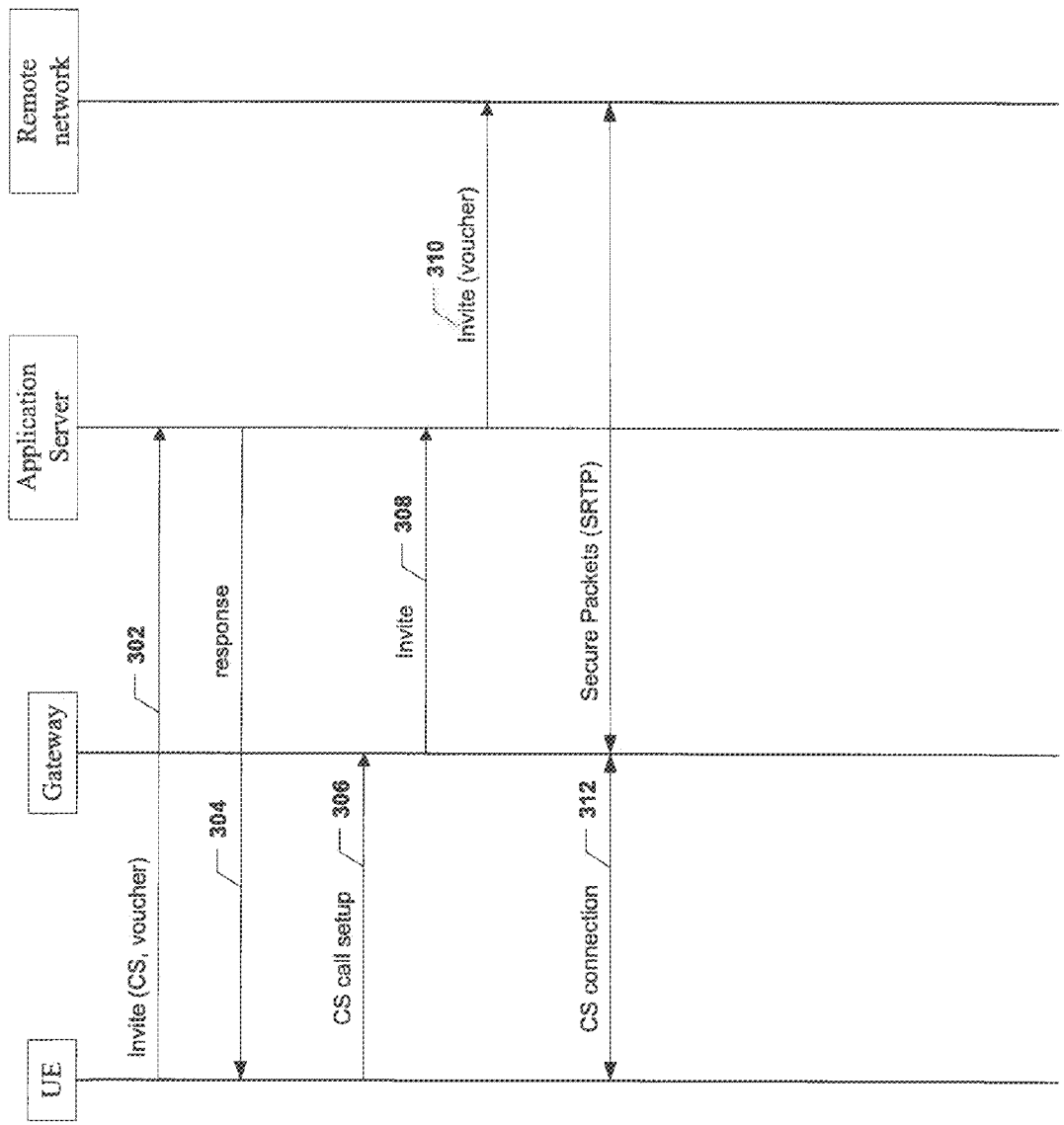
FIGS. 3-8 are data flow diagrams illustrating different embodiments of the invention.

Referring now to FIG. 3, FIG. 3 is a data flow diagram illustrating a process, according to an embodiment of the invention, for enabling UE 102 (e.g., a mobile terminal such as a mobile phone) to originate a call (e.g., a voice call) with a device connected to network 110 and to communicate with the device utilizing both a CS network (e.g., a wireless CS radio access network) and a PS network in a secure manner. In this embodiment, the UE 102 has the capability of communicating with application server 106 using nothing but a PS network and has the capability of establishing a CS call with gateway 104.

As illustrated in FIG. 3, the process may begin with UE 102 transmitting to application server 106 a message 302 (e.g., an SIP invite message or other session initiation message) via a PS network. Message 302 may include the following information: (1) information identifying the called party, (2) encryption key management information (e.g., an encryption key and/or other information necessary to secure the communications), which may be referred to herein as a "voucher", (3) information indicating that UE 102 will use a CS bearer to connect with network 101; and (4) information identifying UE 102 and/or the user of UE 102. In some embodiments, prior to UE 102 transmitting message 302, UE obtains encryption key management information from KMS 204 and/or creates the encryption key management information.

In response to message 302, server 106 may transmit a response message 304 to UE 102. Because message 302 indicates that UE will use a CS bearer to connect with network 101, application server 106 waits to receive a particular message 308 from gateway 104 before transmitting a message 310 to remote network 110. Additionally, in response to receiving message 302, server 106 stores the voucher and associates the voucher with the information identifying the called party and the information identifying UE 102 and/or the user of UE 102.

In response to receiving message 304 from server 106, UE 102 transmits a call setup request 306 to gateway 104. In response, gateway 104 transmits message 308 to application server 106, which message indicates to server 106 that UE 102 has established (or is about to establish) a connection with gateway 104 using a CS bearer. Message 304 may include the following information: (1) information identifying UE 102 and/or the user of UE 102 and (2) information identifying the called party.

In response to receiving message 308, server 106 correlates the message 302 with message 308. For example, server 106 uses the information included in message 308 (i.e., the information identifying UE 102 and/or the user of UE 102 and the information identifying the called party) to retrieve the voucher it had previously received from UE 102. After retrieving the voucher, server 106 transmits to remote network 110 message 310 (e.g., an initiation message, such as, for example, a SIP invite message), which includes the retrieved voucher. After server 106 transmits message 310 additional messages may be transmitted to complete the set-up of the session and bearers, as is well known in the art.

Figure 13:
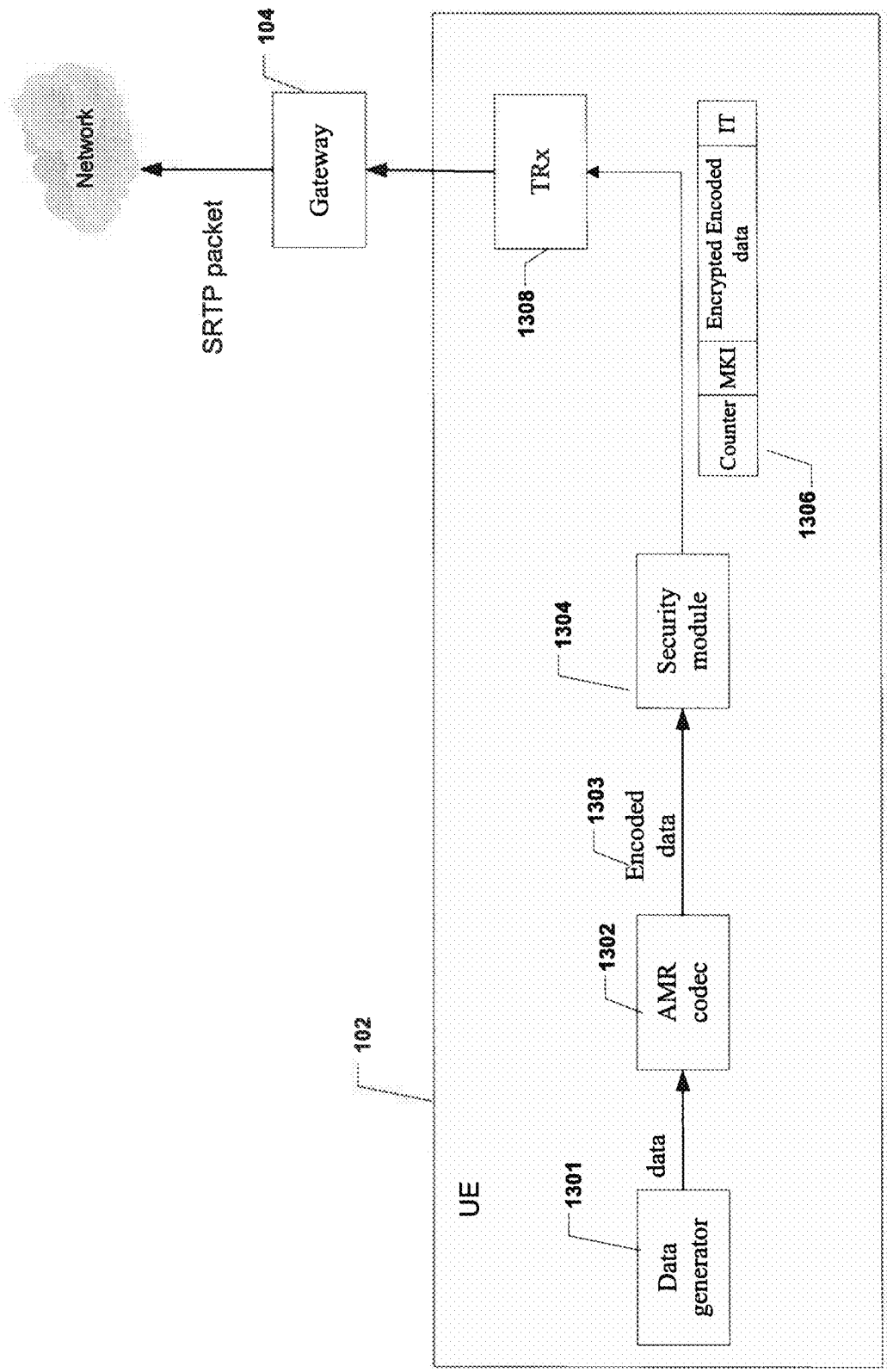
FIGS. 13 and 14 are functional block diagrams of a UE according to an embodiment of the invention.

After the session and bearers are set-up, UE 102 may begin transmitting fames of encrypted data (e.g., frames of encrypted voice data) to gateway 104 using the CS bearer 312. Preferably, the frames include not only the encrypted data but also encryption parameters needed by the called party to decrypt the encrypted data. For example, the encryption parameters may include a sequence number (a.k.a., counter value), an integrity tag, and a key identifier (e.g., an SRTP master key identifier (MKI)). An exemplary payload 1306 of the frame is illustrated in FIG. 13.

Gateway 104 is configured to receive the frames and for each frame, extract the encrypted data and encryption parameters from the frame, create a secure real-time transport protocol (SRTP) protocol data unit ("SRTP packet") that includes the encrypted data and encryption parameters, and transmit the SRTP packet to remote network 110 so that the data is ultimately received by the called party. In this manner, end-to-end media security is established between UE 102 and remote network 110 even though UE 102 connects to network 101 using a CS bearer.

Figure 4:
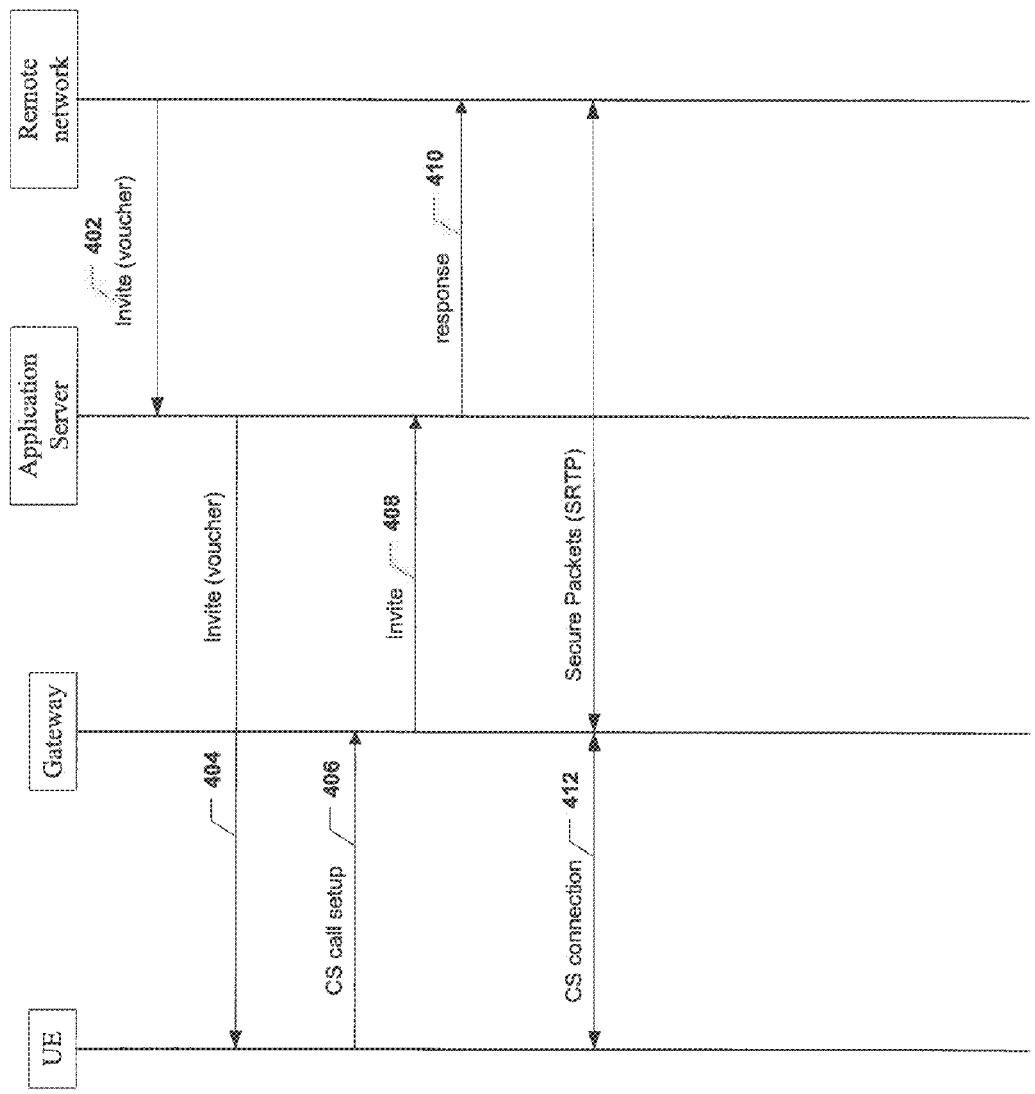

Referring now to FIG. 4 is a data flow diagram illustrating a process, according to an embodiment of the invention, for enabling UE 102 to terminate a call (e.g., a voice call) from a device connected to network 110 and to communicate with the device utilizing both a CS network and a PS network in a secure manner. In this embodiment, the UE 102 has the capability of communicating with application server 106 using nothing but a PS network and has the capability of establishing a CS call with gateway 104.

As illustrated in FIG. 4, the process may begin with server 106 receiving from remote network 110 a message 402 (e.g., an initiation message) via a PS network. Message 402 may include the following information: (1) information identifying the called party (i.e., UE 102), (2) a voucher; and (3) information identifying the calling device or the user of the calling device. In response to receiving message 402, server 106 transmit to UE 102 a message 404 (e.g., an initiation message), which contains the voucher.

In response to message 404, UE 102 transmits a call setup request 406 to gateway 104. In response, gateway 104 transmits to application server 106 a message 408 (e.g., an initiation message), which message may include the following information: (1) information identifying UE 102 and/or the user of UE 102 and (2) information identifying the calling party.

In response to receiving message 408, server 106 determines that message 408 is correlated with message 402. In response to this determination, server 106 transmits to network 110 a response message 410, which is a response to message 402. After server 106 transmits response message 410, additional messages may be transmitted to complete the set-up of the session and bearers, as is well known in the art.

After the session and bearers are set-up, UE 102 may begin transmitting fames of encrypted data (e.g., frames of encrypted voice data) to gateway 104 using the CS bearer 412. Preferably, the frames include not only the encrypted data but also the encryption parameters needed by the called party to decrypt the encrypted data. Gateway 104, as described above, receives the frames and, for each frame, extracts the encrypted data and encryption parameters from the frame, creates an SRTP packet that includes the encrypted data and encryption parameters, and transmit the SRTP packet to remote network 110 so that the data is ultimately received by the calling party. In this manner, end-to-end media security is established between UE 102 and remote network 110 even though UE 102 connects to network 101 using a CS bearer.

Figure 5:
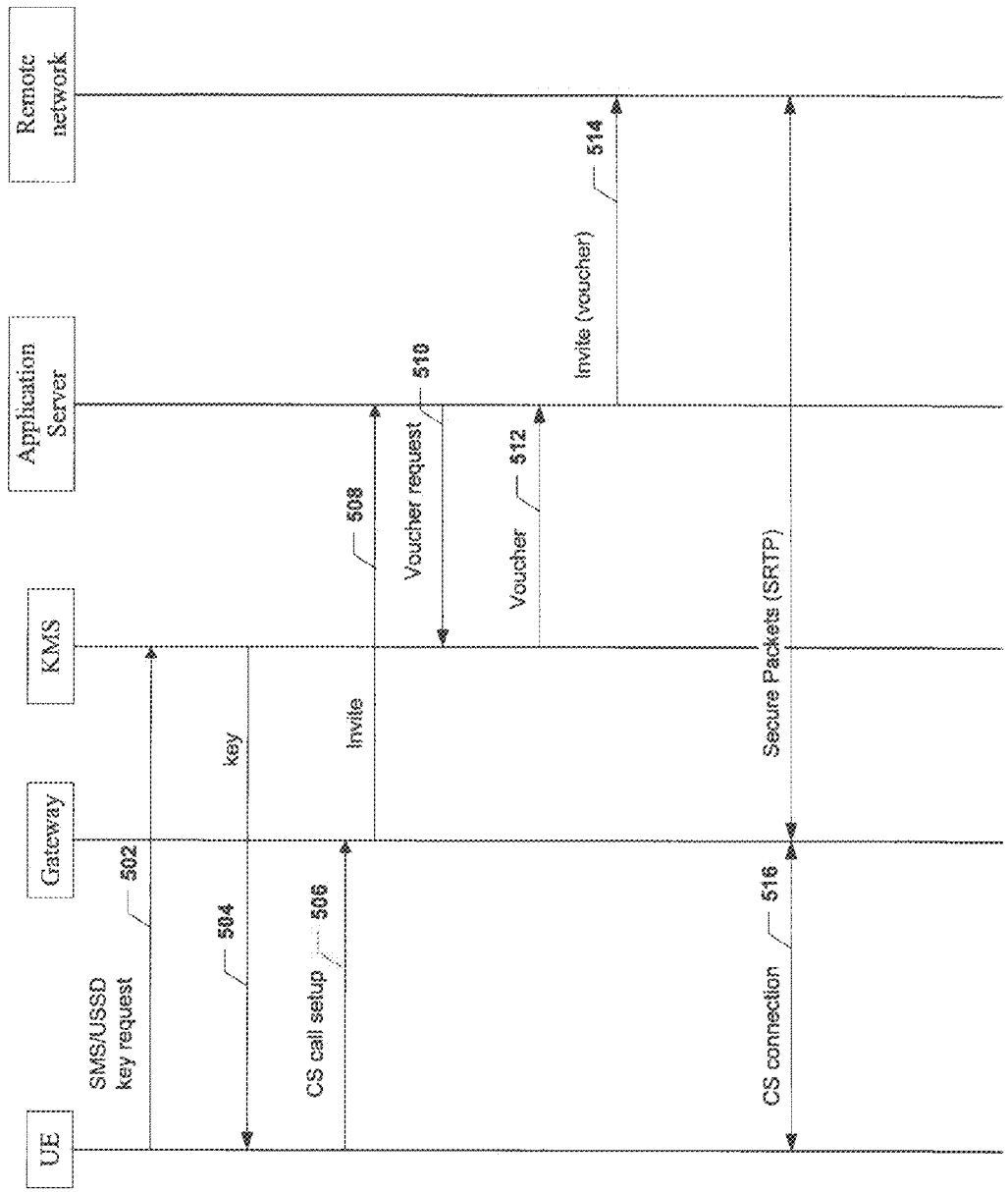

Referring now to FIG. 5, FIG. 5 is a data flow diagram illustrating a process, according to an embodiment of the invention, for enabling UE 102 to originate a call (e.g., a voice call) with a device connected to network 110 and to communicate with the device utilizing both a CS network and a PS network in a secure manner. In this embodiment, the UE 102 does not have the capability of communicating with application server 106 using a PS network, but has the capability of establishing a CS call with gateway 104.

As illustrated in FIG. 5, the process may begin with UE 102 transmitting to KMS 204 a key request message 502. Message 502 may be a short message service (SMS) message, an Unstructured Supplementary Service Data (USSD) message, or other like message. KMS 204, in response to message 502, transmits to UE 102 a message 504 that includes an encryption key. In response to message 504, UE 102 transmits to gateway 104 a call setup request 506. In response, gateway 104 transmits to application server 106 a message 508 (e.g., an initiation message), which message may include the following information: (1) information identifying UE 102 and/or the user of UE 102 and (2) information identifying the called party. Message 508 may also include information indicating that a secure session should be established.

After receiving message 508, server 106 determines whether the message includes information indicating that a secure session should be established. If server 106 determines that a secure session should be established, server 106 transmits to KMS 204 a request message 510 (e.g., a request for a voucher), which includes information identifying UE 102 and/or the user of UE 102. In response to message 510, KMS 204 transmits to server 106 a voucher 512 containing the key (e.g., an encrypted version of the key) that KMS 204 transmitted to UE 102 in message 504. In response to receiving message 512, server 106 transmits to network 110 a message 514 (e.g., an initiation message) that includes the voucher received from KMS 204.

After server 106 transmits message 514, additional messages may be transmitted to complete the set-up of the session and bearers, as is well known in the art. After the session and bearers are set-up, UE 102 may begin transmitting frames of encrypted data (e.g., frames of voice data encrypted using the key received from KMS 204) to gateway 104 using the CS bearer 516. Preferably, the frames include not only the encrypted data but also the encryption parameters needed by the called party to decrypt the encrypted data. Gateway 104, as described above, receives the frames and, for each frame, extracts the encrypted data and encryption parameters from the frame, creates an SRTP packet that includes the encrypted data and encryption parameters, and transmits the SRTP packet to remote network 110 so that the data is ultimately received by the called party. In this manner, end-to-end media security is established between UE 102 and remote network 110 even though UE 102 connects to gateway 104 using CS bearer 512.

Figure 6:
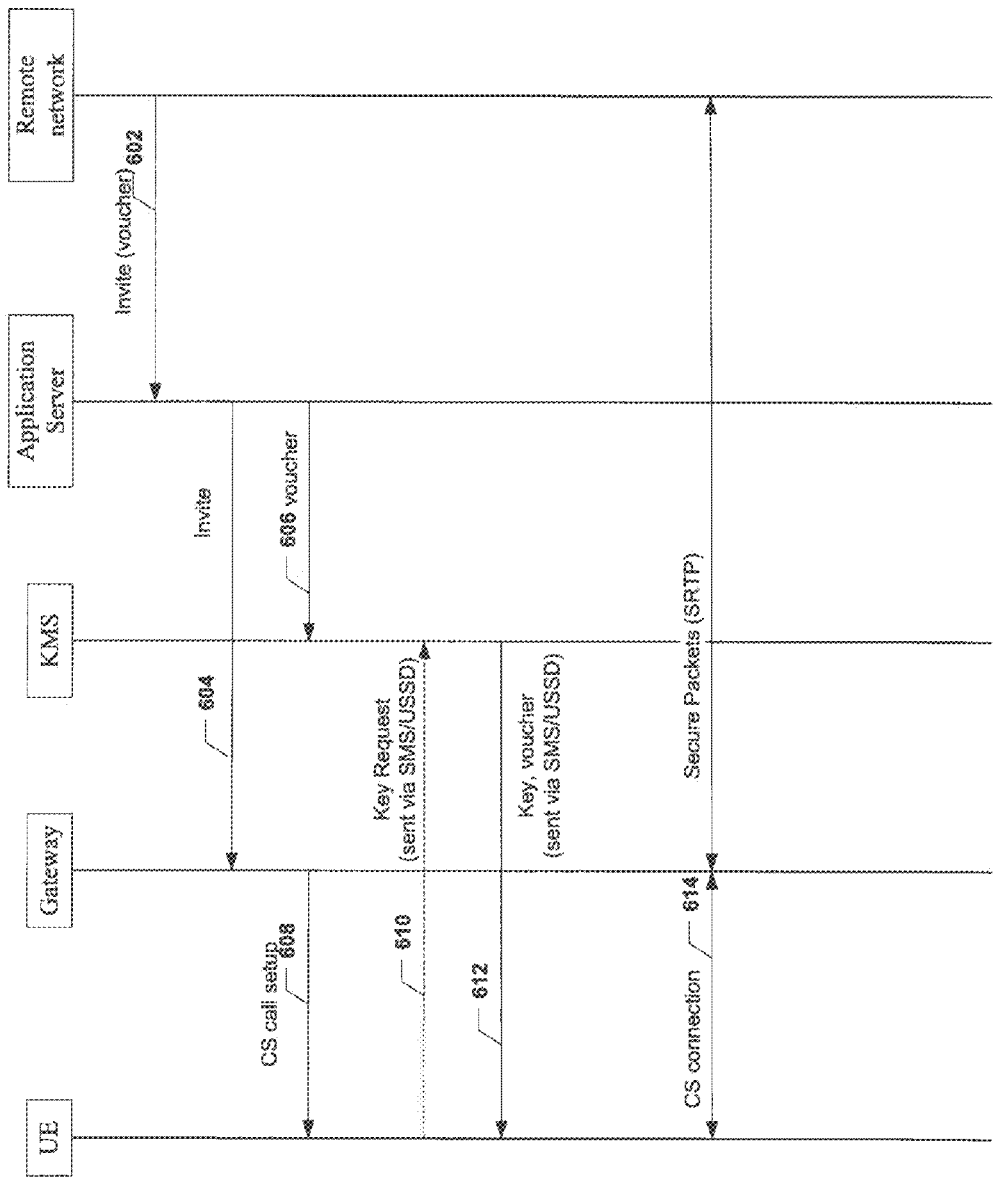

Referring now to FIG. 6 is a data flow diagram illustrating a process, according to an embodiment of the invention, for enabling UE 102 to terminate a call (e.g., a voice call) from a device connected to network 110 and to communicate with the device utilizing both a CS network and a PS network in a secure manner. In this embodiment, the UE 102 does not have the capability of communicating with application server 106 using a PS network, but has the capability of establishing a CS call with gateway 104.

As illustrated in FIG. 6, the process may begin with server 106 receiving from remote network 110 a message 602 (e.g., an initiation message) via a PS network. Message 602 may include the following information: (1) information identifying the called party (i.e., UE 102), (2) a voucher; and (3) information identifying the calling device or the user of the calling device. In response to receiving message 602, server 106 (a) transmits to gateway 604 a message 604 (e.g., an initiation message), which may include information indicating that a secure session should be established and (b) transmits to KMS 204 a message 608 containing the voucher and information identifying UE 102 and/or the user of UE 102 and information identifying the calling party.

In response to message 604, gateway 104 transmits to UE 102 a call setup request 606. In response, UE 102 may transmit to KMS 204 (via SMS or USSD) a message 610 requesting the keys for the session. KMS 204, in response to message 610 or in response to message 608, transmits to UE 102 (via SMS or USSD) the requested keys and possibly also the voucher in message 612.

After transmitting to UE 102, the call set-up message 606, gateway 104 transmits to server 106 a response 614 to message 604. In response to receiving message 614, server 106 transmits to network 110 a response to message 602.

After server 106 transmits response message 614, additional messages may be transmitted to complete the set-up of the session and bearers, as is well known in the art. After the session and bearers are set-up, UE 102 may begin transmitting fames of encrypted data (e.g., frames of voice data encrypted using a key included in the voucher received from KMS 204) to gateway 104 using the CS bearer 618. Preferably, the frames include not only the encrypted data but also the encryption parameters needed by the called party to decrypt the encrypted data. Gateway 104, as described above, receives the frames and, for each frame, extracts the encrypted data and encryption parameters from the frame, creates an SRTP packet that includes the encrypted data and encryption parameters, and transmits the SRTP packet to remote network 110 so that the data is ultimately received by the calling party. In this manner, end-to-end media security is established between UE 102 and remote network 110 even though UE 102 connects to gateway 104 using CS bearer 618.

Figure 7:
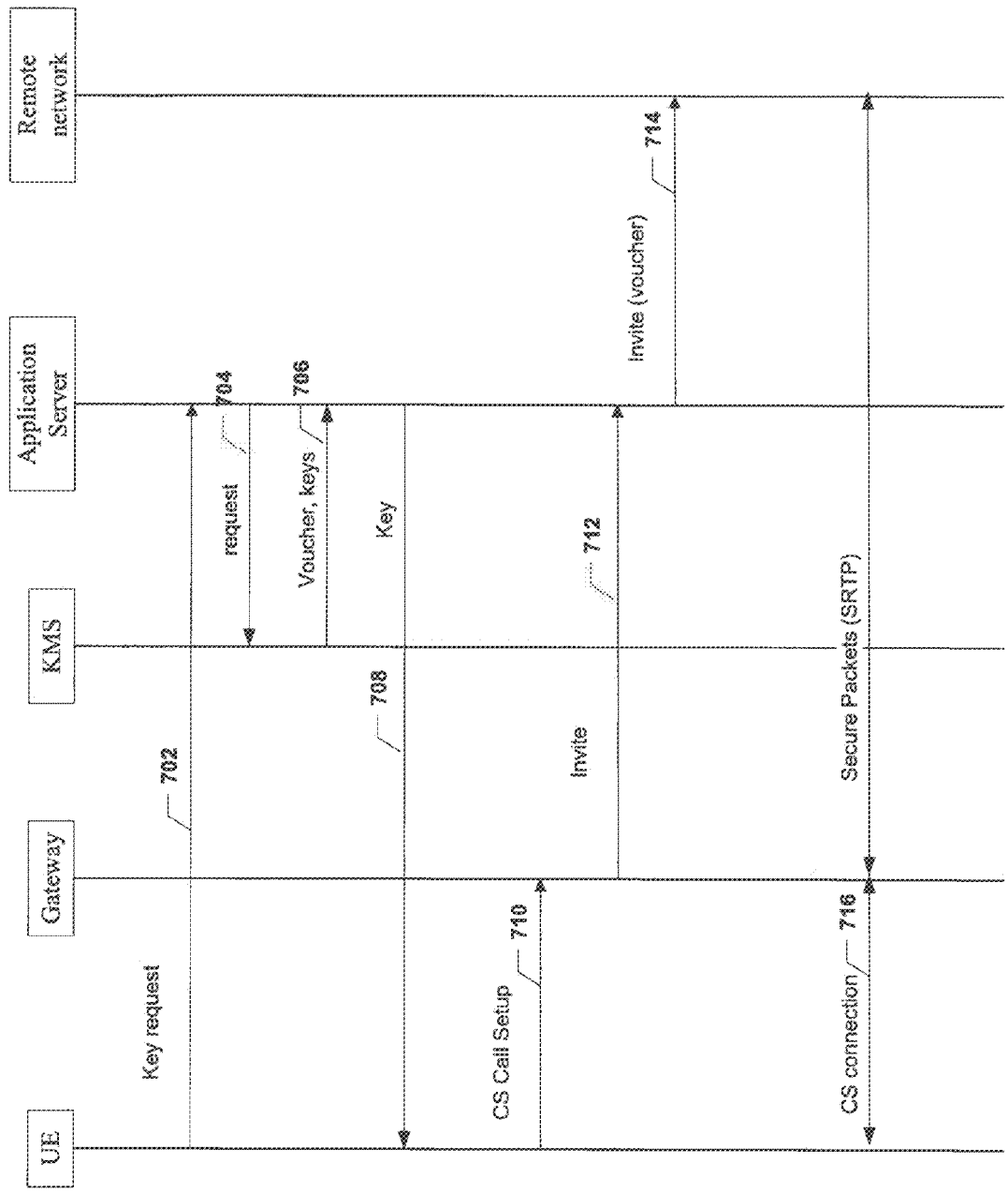

Referring now to FIG. 7, FIG. 7 is a data flow diagram illustrating a process, according to an embodiment of the invention, for enabling UE 102 to originate a call (e.g., a voice call) with a device connected to network 110 and to communicate with the device utilizing both a CS network and a PS network in a secure manner. In this embodiment, the UE 102 has the capability of communicating with application server and has the capability of establishing a CS call with gateway 104.

As illustrated in FIG. 7, the process may begin with UE 102 transmitting to application server 106 a key request message 702. Message 702 may include (1) information identifying UE 102 and/or the user of UE 102 and (2) information identifying the called party. In response to message 702, server 106 transmits to KMS 204 a key request message 704. In response to message 704, KMS 204 transmits to server 106 a message 706 containing a key and a voucher.

After receiving message 706, server 106 (a) stores the voucher and associates the stored voucher with information identifying UE 102 and/or the user of UE 102 and (2) information identifying the called party and (b) transmits to UE 102 a message 708 in response to message 702. Message 708 includes the key received from KMS 204. After receiving message 708 from server 106, UE 102 transmits a call setup request 710 to gateway 104. In response, gateway 104 transmits message 712 (e.g., an initiation message) to application server 106, which message indicates to server 106 that UE 102 has established (or is about to establish) a connection with gateway 104 using a CS bearer. Message 712 may include the following information: (1) information identifying UE 102 and/or the user of UE 102 and (2) information identifying the called party.

In response to receiving message 712, server 106 correlates the key request message 702 with message 712. For example, server 106 uses the information included in message 712 (i.e., the information identifying UE 102 and/or the user of UE 102 and the information identifying the called party) to retrieve the voucher it had previously received from KMS 204. After retrieving the voucher, server 106 transmits to remote network 110 a message 714 (e.g., an initiation message), which includes the retrieved voucher.

After server 106 transmits message 714 additional messages may be transmitted to complete the set-up of the session and bearers, as is well known in the art. After the session and bearers are set-up, UE 102 may begin transmitting fames of encrypted data (e.g., frames of voice data encrypted using the key received from server 106) to gateway 104 using the CS bearer 716. Preferably, the frames include not only the encrypted data but also the encryption parameters needed by the called party to decrypt the encrypted data. Gateway 104, as described above, receives the frames and, for each frame, extracts the encrypted data and encryption parameters from the frame, creates an SRTP packet that includes the encrypted data and encryption parameters, and transmits the SRTP packet to remote network 110 so that the data is ultimately received by the calling party. In this manner, end-to-end media security is established between UE 102 and remote network 110 even though UE 102 connects to gateway 104 using CS bearer 716.

Figure 8:
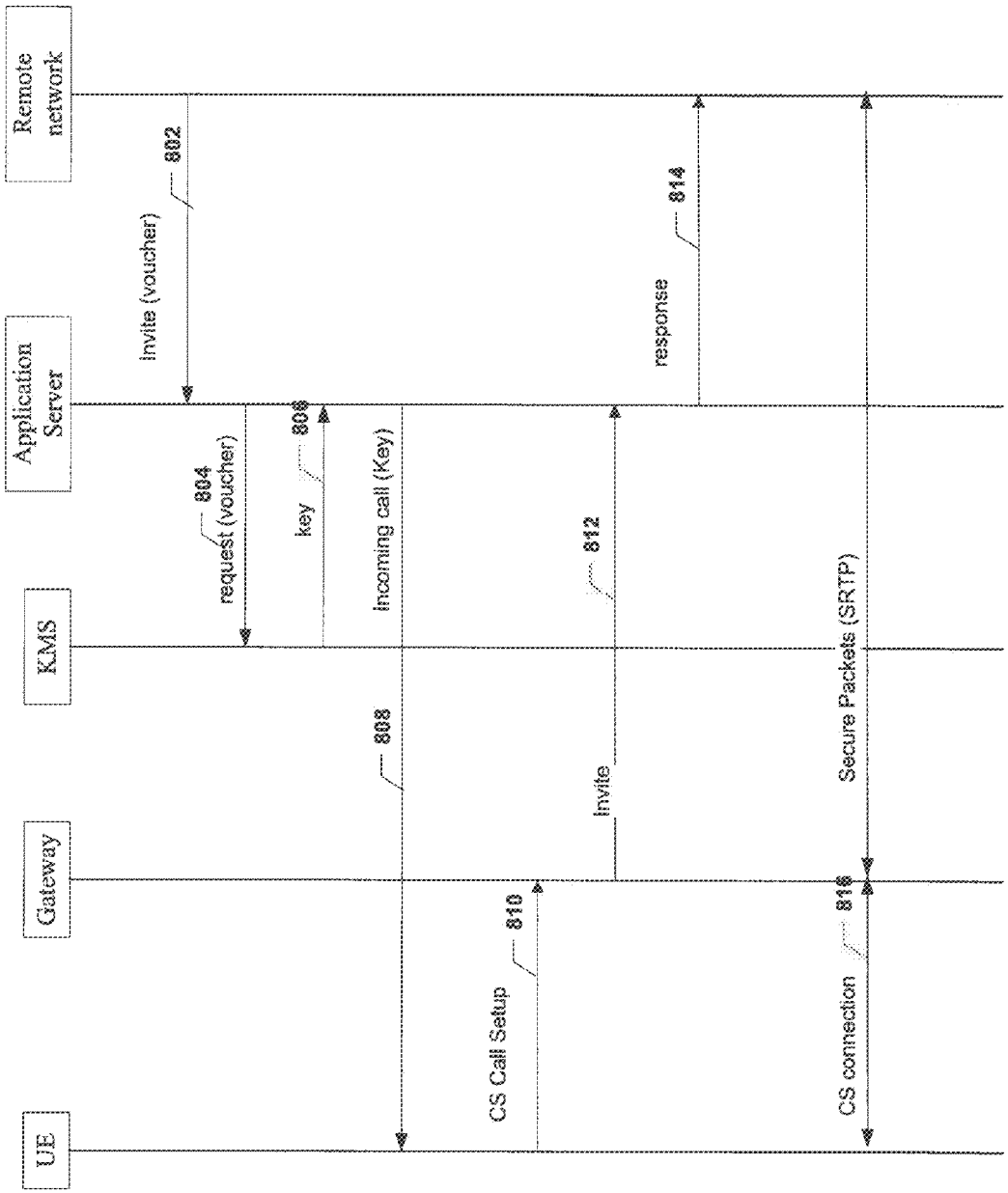

Referring now to FIG. 8, FIG. 8 is a data flow diagram illustrating a process, according to an embodiment of the invention, for enabling UE 102 to terminate a call (e.g., a voice call) from a device connected to network 110 and to communicate with the device utilizing both a CS network and a PS network in a secure manner. In this embodiment, the UE 102 has the capability of communicating with application server and has the capability of establishing a CS call with gateway 104.

As illustrated in FIG. 8, the process may begin with server 106 receiving from network 110 a message 802 (e.g., an initiation message). Message 802 may include (1) information identifying UE 102 and/or the user of UE 102, (2) information identifying the calling party, and (3) a voucher that contains an encrypted key. In response to message 802, server 106 transmits to KMS 204 a key request message 804, which includes the voucher. In response to message 804, KMS 204 transmits to server 106 a message 806 containing the key included in the voucher.

After receiving message 806, server 106 transmits to UE 102 a message 808. Message 808 includes the key received from KMS 204 and indicates to UE 102 that a party is calling UE 102. After receiving message 808 from server 106, UE 102 transmits a call setup request 810 to gateway 104. In response, gateway 104 transmits message 812 (e.g., an initiation message) to application server 106, which message indicates to server 106 that UE 102 has established (or is about to establish) a connection with gateway 104 using a CS bearer. Message 812 may include the information that enables server 106 to correlate message 812 with message 802.

In response to receiving message 812, server 106 correlates message 802 with message 812 and transmits to remote network 110 a response message 814. After server 106 transmits response message 814, additional messages may be transmitted to complete the set-up of the session and bearers, as is well known in the art. After the session and bearers are set-up, UE 102 may begin transmitting fames of encrypted data (e.g., frames of voice data encrypted using the key received from server 106) to gateway 104 using the CS bearer 816. Preferably, the frames include not only the encrypted data but also the encryption parameters needed by the called party to decrypt the encrypted data. Gateway 104, as described above, receives the frames and, for each frame, extracts the encrypted data and encryption parameters from the frame, creates an SRTP packet that includes the encrypted data and encryption parameters, and transmits the SRTP packet to remote network 110 so that the data is ultimately received by the calling party. In this manner, end-to-end media security is established between UE 102 and remote network 110 even though UE 102 connects to gateway 104 using CS bearer 816.

Figure 9:
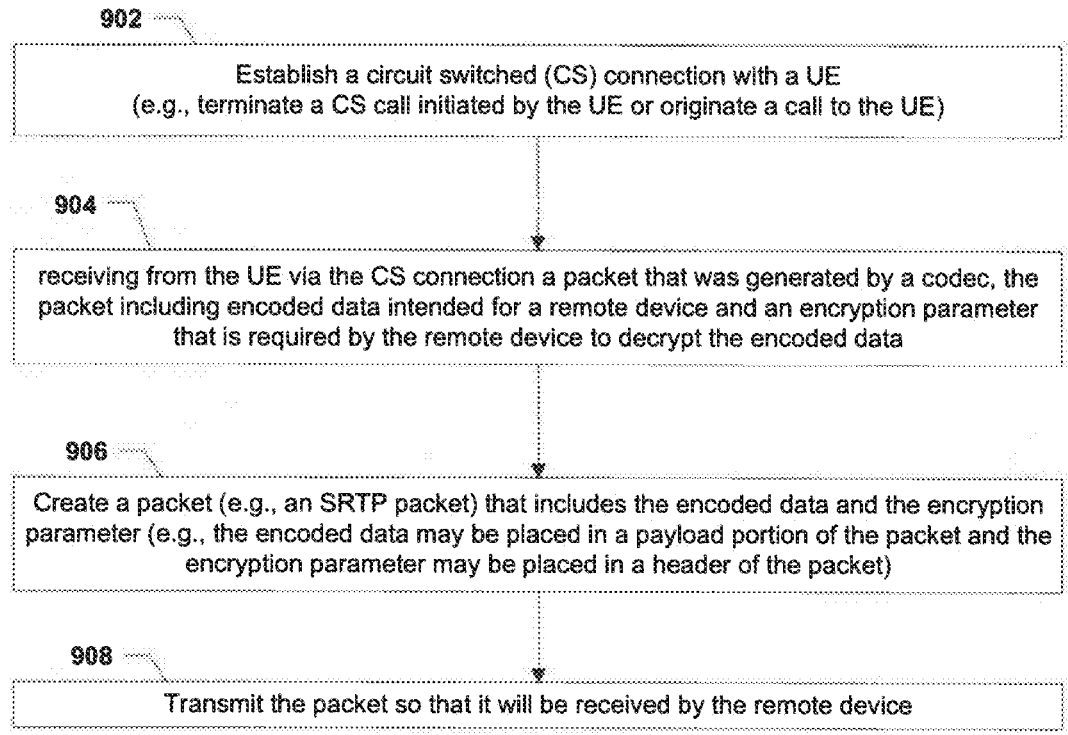
FIGS. 9-11 are flow charts illustrating various processes according to different embodiments of the invention.

Referring now to FIG. 9, FIG. 9 is a flow chart illustrating a process performed by gateway 104, according to some embodiments. The process may begin in step 902, where gateway 104 establishes a CS connection with UE 102 (e.g., gateway 104 terminates a CS call initiated by UE 102 or originates a CS call to UE 102). In step 904, gateway 104 receives from UE 102 via the CS connection a frame that includes encrypted encoded data intended for a remote device and one or more encryption parameters that are needed by the remote device to decrypt the encoded data. In step 906, gateway 104 creates a protocol data unit (e.g., an SRTP protocol data unit) that includes the encrypted encoded data and the encryption parameter(s). For example, the encrypted encoded data may be placed in a payload portion of the SRTP packet and the encryption parameter(s) may be placed in a header portion of the packet. In step 908, gateway 104 transmits the packet so that it will be received by the remote device. In this manner, gateway 104 functions to map secure media from CS domain to the SRTP domain, thereby enabling end-to-end security even though UE 102 access network 101 using the CS technology and not PS technology.

Figure 10:
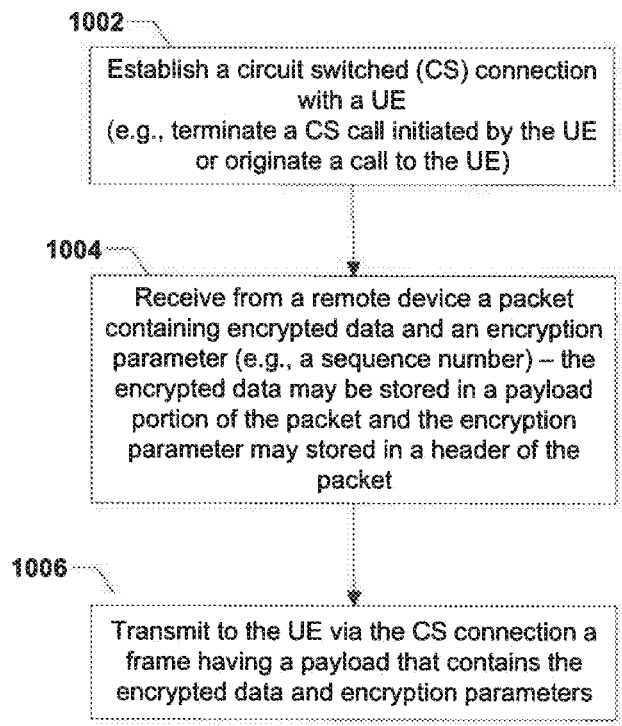

Referring now to FIG. 10, FIG. 10 is a flow chart illustrating another process performed by gateway 104, according to some embodiments. The process may begin in step 1002, where gateway 104 establishes a CS connection with UE 102. In step 1004, gateway 104 receives from a remote device an SRTP packet containing encrypted data and one or more encryption parameter(s) (e.g., a sequence number). The encrypted data is stored in a payload portion of the packet and the encryption parameter is stored in a header of the packet. In step 1006, gateway 104 transmits to UE 102 via the CS connection a frame containing the encrypted data and encryption parameters, where the encrypted data and encryption parameter are included in the same payload portion of the packet. In some embodiments, the payload portion of the frame consists of (or consists essentially of) the encrypted data and encryption parameters.

Figure 11:
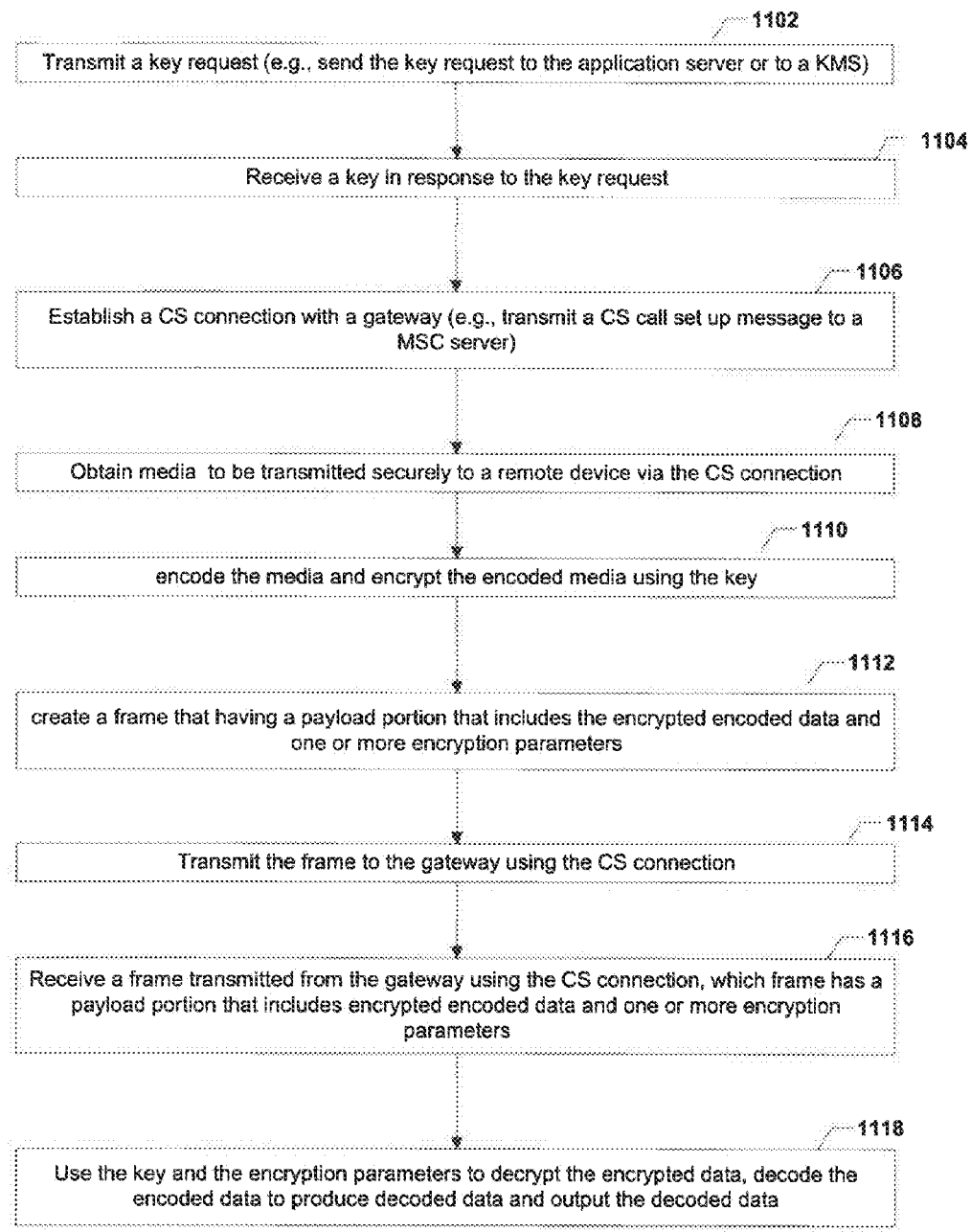

Referring now to FIG. 11, FIG. 11 is a flow chart illustrating a process performed by UE 102, according to some embodiments. The process may begin in step 1102, where UE 102 transmits a key request. For example, in step 1102, UE 102 may send to KMS 204 an SMS/USSD message that includes a request for a key or UE 102 may send to server 106, via a CS network, a message that includes a request for a key. In step 1104, UE 102 receives a key in response to the key request. For example, in step 1104, UE 102 may receive the key from the KMS via an SMS/USSD message or may receive the key, via a CS network, from server 106. In step 1106, UE 102, establishes a CS connection with gateway 104 (e.g., UE 102 transmit a CS call set up message to MSC server 212). In step 1108, UE 102 obtains or generates media (e.g., voice data) to be transmitted securely to a remote device via the CS connection. In step 1110, UE 102 encodes the media and then encrypts the encoded media using a key received in step 1104. In step 1112, UE 102 creates a secure data frame that includes the encrypted encoded data and one or more encryption parameters (e.g., a counter value and an integrity protection tag). In step 1114, UE 102 transmits the secure data frame to gateway 104 using the CS connection. In step 1116, UE 102 receives a frame transmitted from gateway 104 using the CS connection, which frame has a payload portion that includes encrypted encoded data and one or more encryption parameters. In step 1118, UE 102 uses a key received in step 1104 and the encryption parameters included in the frame to decrypt the encrypted data included in the frame, decodes the encoded data to produce decoded data, and then outputs the decoded data (e.g., in the case the data includes an audio signal, the data may be provided to a speaker included in the UE to produce a sound wave corresponding to the audio signal and in the case the data includes a video signal, the data may be provided to a driver that drives a display of the UE so that the video can be reproduced on the UE's display).

Figure 12:
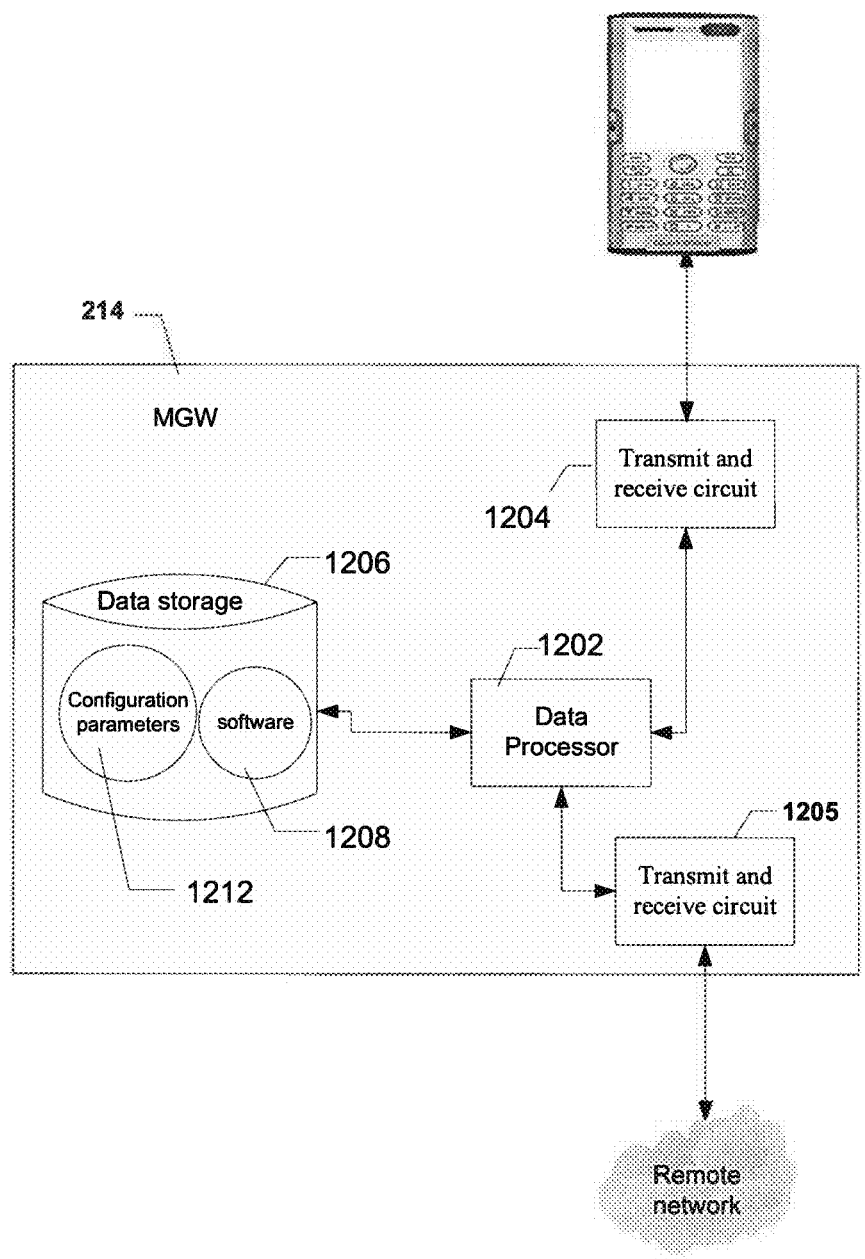
FIG. 12 is a functional block diagram of a gateway according to an embodiment of the invention.

Referring now to FIG. 12, FIG. 12 is a functional block diagram of gateway 104 according to some embodiments of the invention. As shown, gateway 104 may comprise a data processing system 1202 (e.g., one or more microprocessors), a data storage system 1206 (e.g., one or more non-volatile storage devices) and computer software 1208 stored on the storage system 1206. Configuration parameters 1210 may also be stored in storage system 1206. Gateway 102 also may comprise transmit/receive (Tx/Rx) circuitry 1204 for transmitting frames to and receiving frames from UE 102 and transmit/receive (Tx/Rx) circuitry 1205 for transmitting packets to and receiving packets from network 110.

Software 1208 is configured such that when processor 1202 executes software 1208, gateway 104 performs steps described herein. For example, software 1208 may include: (1) a connection establishing module for establishing a circuit switched connection with a communication device (e.g., UE 102); a receiving module for receiving from the communication device via the circuit switched connection a frame including encrypted encoded data intended for a remote communication device and an encryption parameter that is required by the remote communicate device to decrypt the encrypted encoded data; a protocol data unit creating module for creating a protocol data unit that includes the encoded data and the encryption parameter; and a transmitting module for transmitting, via a packet switched network, the protocol data unit so that it will be received by the remote communication device.

Referring now to FIG. 13, FIG. 13 is a functional block diagram of UE 102 according to some embodiments. In the embodiment illustrated, UE 102 includes a data generator 1301, a codec 1302, a security module 1304 and a transmit/receive circuit 1308 for transmitting and receiving data. Data generator 1301 may include a microphone for converting sound waves (e.g., speech) to an electrical signal, an amplifier for amplifying the signal, and an analog to digital converter for converting the continuous electrical signal to a digital signal. The data generated by generator 1301 is input into codec 1302 (e.g., a speech codec such as the adaptive multi-rate (AMR) codec) that produces encoded data 1303. Encoded data 1303 is an input to a security module 1304. Security module 1304 is configured to encrypt the encoded data using an encryption key and is configured to form a fame payload 1306 that contains one or more encryption parameters and the encrypted encoded data. In the embodiment illustrated, the frame payload 1306 of the frame includes only the encrypted data and the encryption parameters. Payload 1306 is then obtained by transmitter 1308, which is configured to include payload 1306 in a frame and transmit the frame using a CS connection.

While security module 1304 is shown as being separate and distinct from codec 1302, this is not a requirement. It is contemplated that codec 1302 can be configured to perform not only normal encoding operations, but also the functions of security module 1304.

Figure 14:
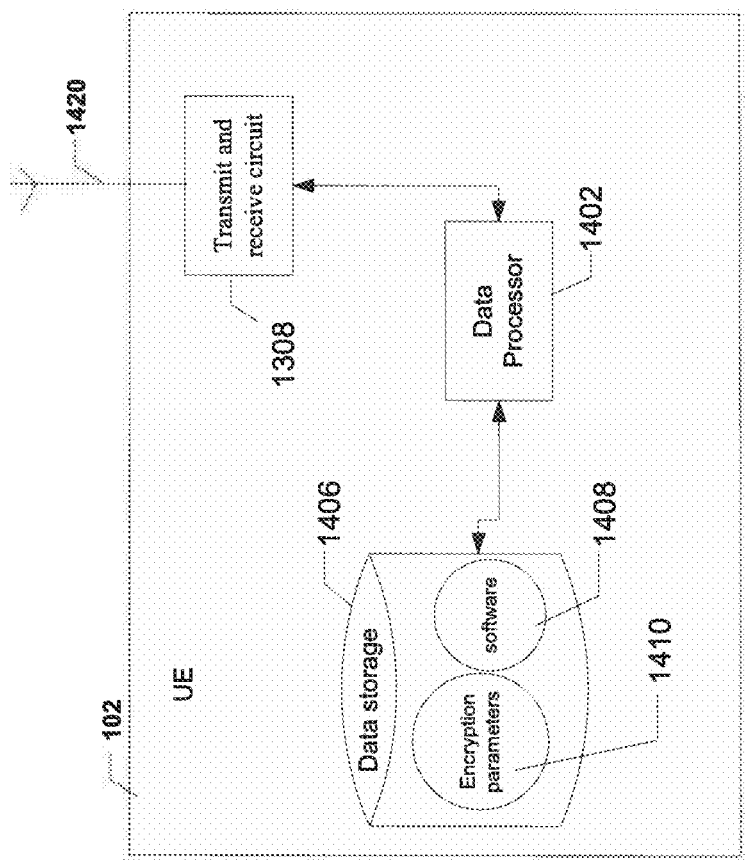

Codec 1302 and/or security module 1304 may be implemented in software and/or hardware. Accordingly, UE 102 may include (i) a data storage system 1406 for storing encryption keys, encryption parameters 1410, and software 1408 for implementing codec 1302 and/or module 1304 and (ii) a processor 1402 for executing the software (see FIG. 14). UE 102 may also have an antenna 1420.

Figure 15:
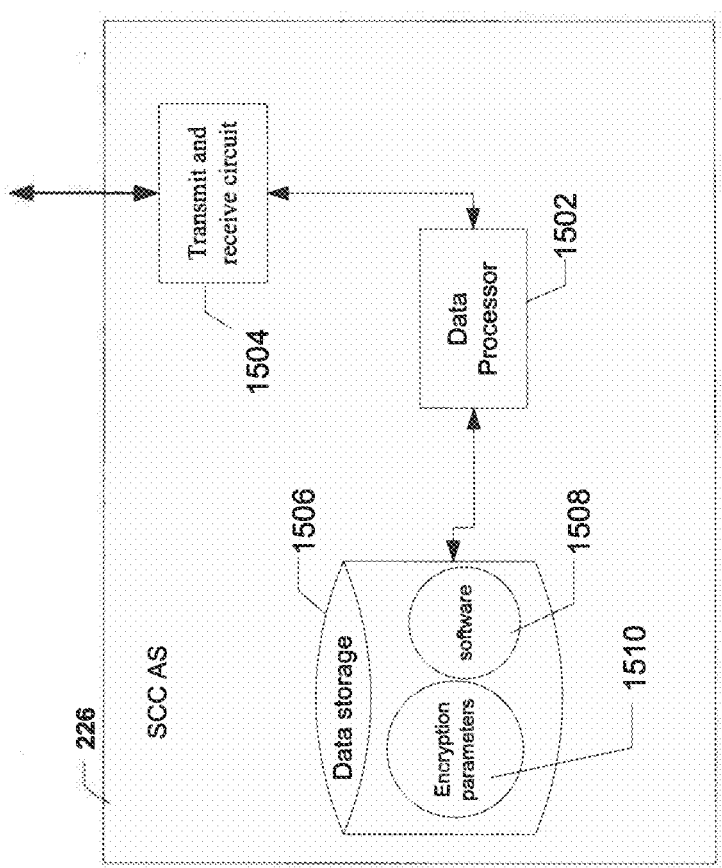
FIG. 15 is a functional block diagram of an application server according to an embodiment of the invention.

Referring now to FIG. 15, FIG. 15 is a functional block diagram of application server 226 according to some embodiments of the invention. As shown, server 226 may comprise a data processing system 1502 (e.g., one or more microprocessors), a data storage system 1506 (e.g., one or more non-volatile storage devices) and computer software 1508 stored on the storage system 1506. Configuration parameters 1510 may also be stored in storage system 1506. Server also may comprise transmit/receive (Tx/Rx) circuitry 1504 for communicating with other servers and clients.

Software 1508 is configured such that when processor 1502 executes software 1508, server 226 performs steps described herein. For example, software 1508 may include: (1) an initiation message receiving module for receiving an initiation message (e.g., a SIP invite message or other initiation message) transmitted from UE, (2) a voucher storing module for storing a voucher included in the initiation message; (3) a voucher retrieving module for retrieving the voucher in response to receiving from gateway 104 an initiation message that correlates with an earlier initiation message received from UE 102; (4) an initiation creating and transmitting module for creating and transmitting an initiation message to network 110 in response to receiving from gateway 104 the initiation message that correlates with the earlier initiation message received from UE 102; (5) an initiation message receiving module for receiving an initiation message transmitted from network 110 which initiation message identifies UE 102 as a called party; (6) an initiation transmitting module for transmitting an initiation message to UE 102 in response to receiving the initiation message from network 110; (7) an initiation response creating and transmitting module for creating and transmitting an initiation response message to network 110 in response to receiving from gateway 104 an initiation message that correlates with the earlier initiation message received from network 110; (8) a voucher requesting module for transmitting a voucher request to KMS 204 in response to receiving an initiation message from gateway 104; and (9) an initiation message transmitting module for transmitting to network 110 an initiation message containing a voucher received from KMS 204.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

The invention claimed is:

1. A method performed by an application server to facilitate communication between a mobile terminal and another terminal, comprising:
    receiving at the application server a session initiation message transmitted from the mobile terminal, the session initiation message comprising a voucher;
    storing the voucher included in the session initiation message;
    receiving at the application server a session initiation message transmitted from a gateway;
    determining whether the session initiation message transmitted from the gateway correlates with the session initiation message transmitted from the mobile terminal;
    retrieving the voucher in response to determining that the session initiation message transmitted from the gateway correlates with the session initiation message transmitted from the mobile terminal; and
    transmitting an session initiation message to another server after retrieving the voucher, wherein the session initiation message transmitted to the another server includes the voucher, wherein
    the session initiation message transmitted from the mobile terminal is received via a packet switched network and includes information indicating that the mobile terminal shall use a circuit switched connection when communicating with the another terminal.

2. The method of claim 1, wherein the voucher comprises an encryption key.

3. The method of claim 1, wherein the step of determining whether the session initiation message transmitted from the gateway correlates with the session initiation message transmitted from the mobile terminal comprises determining whether information included in the session initiation message transmitted from the gateway matches information that was included in the session initiation message transmitted from the mobile terminal.

4. An application server for facilitating communications between a mobile terminal and another terminal, comprising:

a receiver operable to receive a session initiation message transmitted from the mobile terminal, the session initiation message comprising a voucher;

a data storage unit for storing the voucher included in the session initiation message;

a message correlating module configured to determine whether a session initiation message transmitted from a gateway correlates with the session initiation message transmitted from the mobile terminal;

a voucher retrieving modules configured to retrieve the voucher in response to a determination that the session initiation message transmitted from the gateway correlates with the session initiation message transmitted from the mobile terminal; and a transmitter operable to transmit a session initiation message to another server after retrieving the voucher, wherein the session initiation message transmitted to the another server includes the voucher, wherein the receiver is operable to receive the session initiation message via a packet switched network, and said session initiation message includes information indicating that the mobile terminal shall use a circuit switched connection when communicating with the another terminal.

5. The application server of claim 4, wherein the message correlating module is configured to determine whether the session initiation message transmitted from the gateway correlates with the session initiation message transmitted from the mobile terminal by determining whether information included in the session initiation message transmitted from the gateway matches information included in the session initiation message transmitted from the mobile terminal.

6. An application server for facilitating communications between a mobile terminal and another terminal, comprising:

one or more receivers operable to: receive from a gateway an initiation message indicating that the mobile terminal has requested establishment of a secure session with the other terminal and receive a key request message transmitted from the mobile terminal;

a key management module configured to: retrieve a voucher from a key management system in response to the receiver receiving the initiation message from the gateway and transmit a key to the mobile terminal in response to receipt of the key request message;

a data storage unit for storing the key;

an initiation message transmitting module configured to (a) determine whether the stored key is associated with information that matches information included in the initiation message transmitted from the gateway and (b) in response to determining that that the stored key is associated with information that matches information included in the initiation message transmitted from the gateway, transmit to another server an initiation message; and a transmitter operable to transmit the retrieved voucher to another application server in response to the key management module retrieving the voucher.

7. The application server of claim 6, wherein the initiation message transmitted to the other server comprises an encrypted copy of the key.

8. The application server of claim 6, wherein the receiver is operable to receive the key request message via a packet switched network.

9. The application server of claim 6, wherein the receiver is operable to receive the key request message via a circuit switched network.

10. The application server of claim 6, wherein the key management module is further configured, such that, in response to receipt of the key request message and prior to transmitting the key to the mobile terminal, the key management module obtains the key from a key management system.

* * * * *